(12) United States Patent
Kim et al.

(10) Patent No.: US 10,394,526 B2
(45) Date of Patent: Aug. 27, 2019

(54) TRUE RANDOM NUMBER GENERATOR AND OSCILLATOR

(71) Applicant: POSTECH ACADEMY-INDUSTRY FOUNDATION, Pohang-si (KR)

(72) Inventors: Eunhwan Kim, Pohang-si (KR); Jae-Joon Kim, Pohang-si (KR)

(73) Assignee: POSTECH ACADEMY-INDUSTRY FOUNDATION, Pohang-si (KR)

( * ) Notice: Subject to any disclaimer, the term of this patent is extended or adjusted under 35 U.S.C. 154(b) by 0 days.

(21) Appl. No.: 15/798,267

(22) Filed: Oct. 30, 2017

(65) Prior Publication Data

US 2018/0129477 A1 May 10, 2018

(30) Foreign Application Priority Data

Nov. 9, 2016 (KR) .................. 10-2016-0148589

(51) Int. Cl.
*G06F 7/58* (2006.01)
(52) U.S. Cl.
CPC .................... *G06F 7/588* (2013.01)
(58) Field of Classification Search
USPC ........................................... 708/251
See application file for complete search history.

(56) References Cited

U.S. PATENT DOCUMENTS

| 2007/0133790 | A1* | 6/2007 | Chang ............... G06F 7/588 380/46 |
| 2011/0131263 | A1* | 6/2011 | Vasyltsov ........... G06F 7/588 708/251 |
| 2012/0221616 | A1* | 8/2012 | Yasuda .............. G06F 7/588 708/251 |
| 2018/0129477 | A1* | 5/2018 | Kim .................. G06F 7/588 |

FOREIGN PATENT DOCUMENTS

| KR | 20070068990 A | 7/2007 |
| KR | 20110060080 A | 6/2011 |

* cited by examiner

*Primary Examiner* — David H Malzahn
(74) *Attorney, Agent, or Firm* — Morgan, Lewis & Bockius LLP (57) ABSTRACT

Provided are a true random number generator and an oscillator. The random number generator includes an oscillator configured to output signals and oscillate a random number of times until phases of the signals being output are inverted with respect to each other after initialization, and a counter configured to count the number of oscillations. The counted number of oscillations is used as a seed for generating a random number.

13 Claims, 7 Drawing Sheets

FIG. 7 ated States Patent US 10,394,526 B2

TRUE RANDOM NUMBER GENERATOR AND OSCILLATOR

CROSS-REFERENCE TO RELATED APPLICATION

This application claims priority to and the benefit of Korean Patent Application No. 10-2016-0148589, filed on Nov. 9, 2016, the disclosure of which is incorporated herein by reference in its entirety.

BACKGROUND

1. Field of the Invention

The present invention relates to a true random number generator and an oscillator.

2. Discussion of Related Art

A random number is widely used in various industries, such as computer simulation, computer and video games, gambling, and the like. In particular, an encryption technology for a security system requires a quality random number. A true random number may be a kind of high-quality random number. While a strong pseudo random number cannot be predicted, the same true random number cannot be generated twice. Therefore, a true random number is generated from an entropy source which satisfies such a characteristic, and a source which provides physical noise and the like is used as the entropy source.

A true random number generator may generate a true random number using a noise signal. Since the magnitude of the noise signal is too small to generate a random number, a random number may be generated through a process of amplifying or accumulating the noise signal. However, a problem of a slightly biased random number being generated may occur according to a method of processing noise. Also, a problem may arise in that a random number generated by a true random number generator may be damaged by an attack for stopping a security system under an arbitrary external condition.

SUMMARY OF THE INVENTION

A true random number generator according to an exemplary embodiment of the present invention is intended to solve these problems of related art. In other words, an exemplary embodiment of the present invention is directed to providing a true random number generator which operates as a high-entropy source and thus is stable against a change in external conditions or an attack.

According to an aspect of the present invention, there is provided a random number generator including: an oscillator configured to output signals and oscillate a random number of times due to noise until phases of the signals being output are inverted with respect to each other after initialization; and a counter configured to count the number of oscillations, wherein the counted number of oscillations is used as a seed for generating a random number.

According to another aspect of the present invention, there is provided an oscillator for generating a random number, wherein unit cells are cascaded to oscillate and individually include a pair of output circuits, and each of the pair of output circuits includes: a P-type metal oxide semiconductor (PMOS) transistor and an N-type metal oxide semiconductor (NMOS) transistor connected between a driving voltage and a common node and having gate electrodes connected to each other to receive an input signal; and input signal degrading resistances connected between a drain electrode of the PMOS transistor and a drain electrode of the NMOS transistor and configured to reduce influence of the input signal on an output signal and increase influence of noise.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
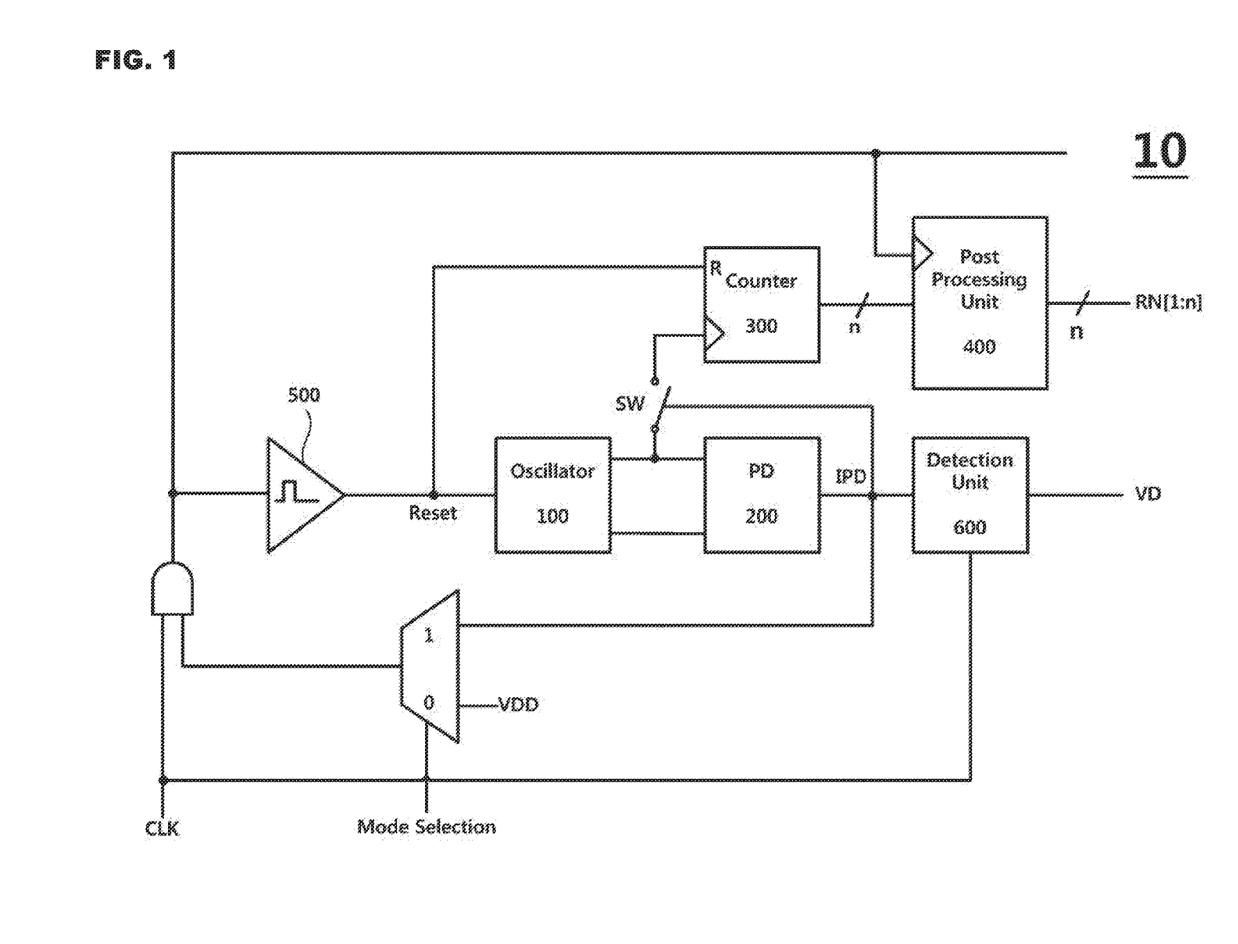
FIG. 1 is a block diagram showing a summary of a random number generator according to an exemplary embodiment.

Hereinafter, exemplary embodiments of the present invention will be described in detail with reference to the accompanying drawings. FIG. 1 is a block diagram showing a summary of a random number generator 10 according to an exemplary embodiment. Referring to FIG. 1, the random number generator 10 includes a differential structure oscillator 100 which outputs signals and oscillates a random number of times due to noise until phases of the signals being output are inverted with respect to each other after initialization, and a counter 300 which counts the number of oscillations.

According to an exemplary embodiment, the random number generator includes a phase detector 200 and a switch SW. The phase detector 200 receives the output signals of the differential structure oscillator 100 to determine whether phases of the output signals have been inverted with respect to each other. The switch SW provides the output signal of the oscillator 100 to the counter 300 or blocks the output signal, and is controlled to be turned on or off by an output of the phase detector 200.

According to an exemplary embodiment, the random number generator 10 may further include a multiplexer. The multiplexer may be set to a normal operation mode or an asynchronous mode by a mode selection signal. In the asynchronous mode, the multiplexer generates a random number at the fastest rate without synchronizing with an external clock. In a fast-rate mode, a clock signal CLK is in a logic-high state, and the edge of a signal IPD output by the phase detector 200 becomes a output synchronization signal.

According to an exemplary embodiment, the random number generator 10 includes a post processing unit 400, and the post processing unit 400 includes a register 410 (see FIG. 4) which stores the number of oscillations counted by the counter 300 and a calculator 420 (see FIG. 4) which performs a logical operation on the number of oscillations.

According to an exemplary embodiment, the random number generator 10 includes a pulse generator 500, which initializes the differential structure oscillator 100 by providing an initialization signal.

Figure 2A:
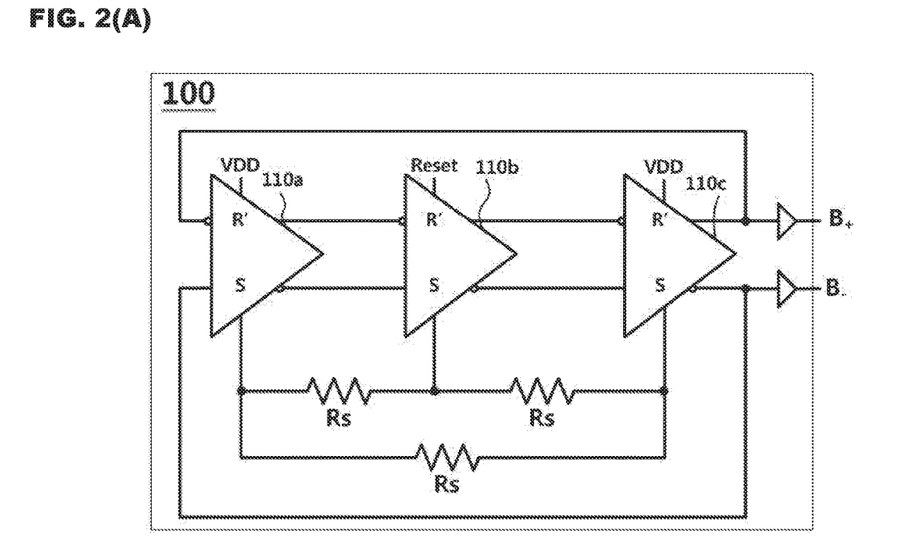
FIG. 2(A) is a diagram showing a connection of unit cells included in a differential structure oscillator.
Figure 2B:
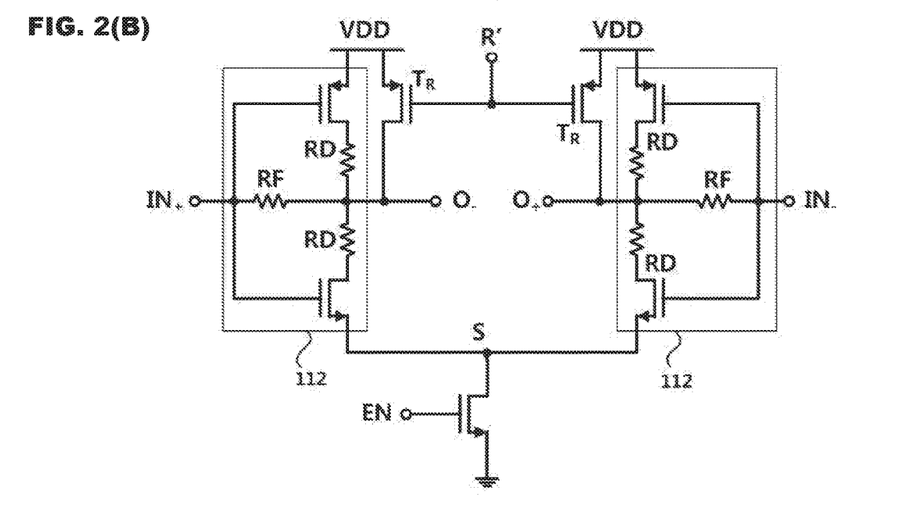
FIG. 2(B) shows a schematic circuit diagram of each unit cell.

FIGS. 2(A) and 2(B) are diagrams showing a summary of the differential structure oscillator 100. FIG. 2(A) is a diagram showing a connection of unit cells 110*a*, 110*b*, and 110*c* included in the differential structure oscillator 100, and FIG. 2(B) shows a schematic circuit diagram of each unit cell. Referring to FIGS. 2(A) and 2(B), the plurality of unit cells 110*a*, 110*b*, and 110*c* are connected as a cascade to provide an oscillating output. For example, each unit cell includes a reset electrode R', a common electrode S, inputs including an inverting input $IN_-$ and a non-inverting input $IN_+$, and outputs including an inverting output $O_-$ and a non-inverting output $O_+$. According to an exemplary embodiment shown in FIG. 2(B), the reset electrode R' receives an active low signal to reset each unit cell.

Each unit cell includes a pair of output circuits 112 which provide outputs. An amplifier included in each of the pair of output circuits 112 includes a P-type metal oxide semiconductor (PMOS) transistor and an N-type metal oxide semiconductor (NMOS) transistor connected between a driving voltage VDD and a common node S, and signal degrading resistances RD connected to drain electrodes of the individual transistors. The amplifier included in each of the pair of output circuits 112 includes the signal degrading resistances RD to increase influence of an input signal on an output signal compared to influence of noise on the output signal. Therefore, it is possible to increase entropy of the output signal.

According to an exemplary embodiment, the amplifier further includes a feedback resistance RF. The feedback resistance RF serves to reduce influence of a mismatch between elements included in the amplifier. Since an output of the amplifier may have a bias due to the mismatch, the feedback resistance RF which performs a negative feedback function is placed between the output and the input to remove the bias from the output signal.

According to an exemplary embodiment, each of the unit cells 110*a*, 110*b*, and 110*c* further include an activation transistor which is connected to the common node S through an electrode and is turned on by an enable signal EN to activate the corresponding unit cell. Another electrode of the activation transistor may be connected to a current-adjusting resistance RS.

According to an exemplary embodiment, an inverting output of a unit cell is provided as a non-inverting input to another unit cell which is connected to the unit cell in the cascade, and a non-inverting output is provided as an inverting input to another unit cell connected to the other unit cell in the cascade.

Figure 6:
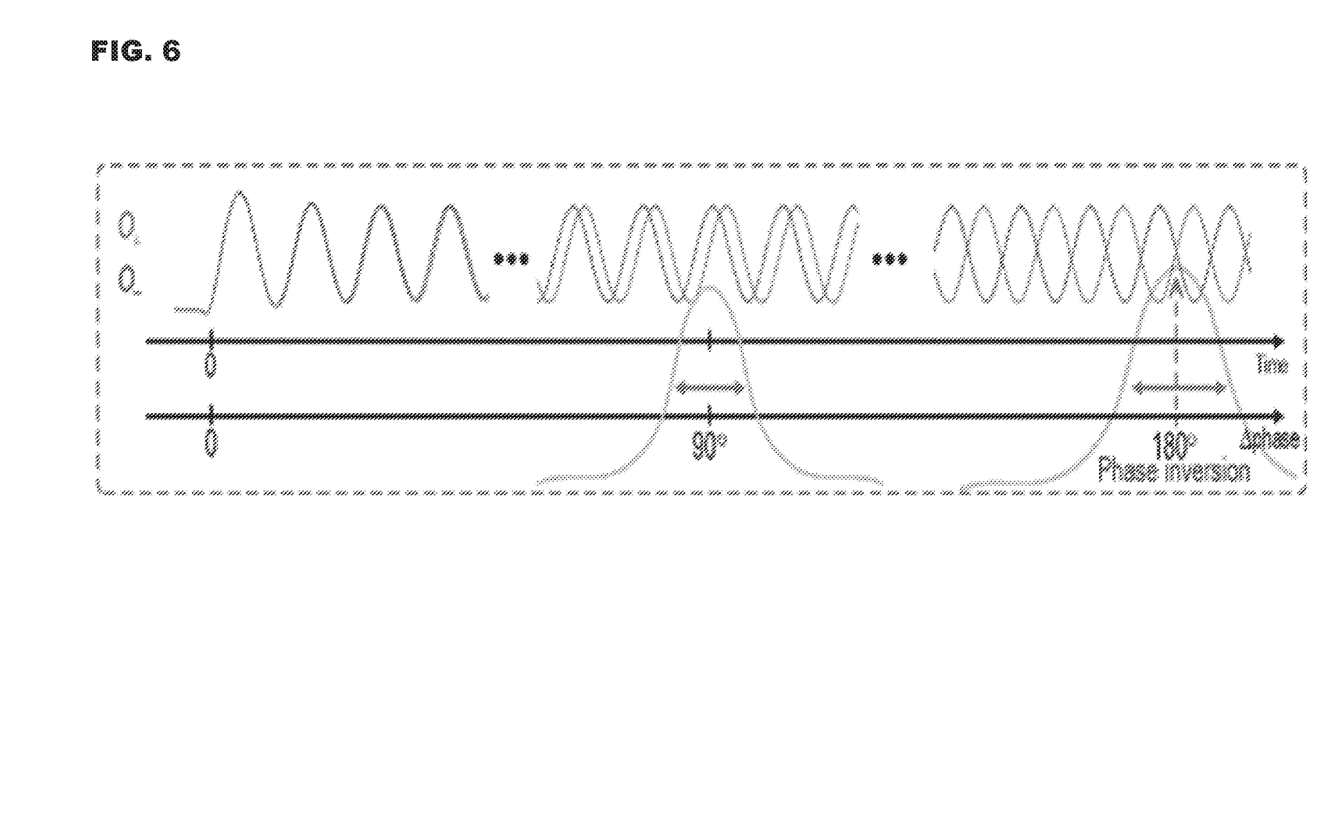
FIG. 6 is a diagram schematically showing an output signal of a differential structure oscillator.

Each of the unit cells 110*a*, 110*b*, and 110*c* may be reset by a signal provided to the reset electrode R'. In the block diagram shown in FIG. 2(A), when a signal of a logic-low state is provided to the reset electrode of the unit cell 110*b*, reset transistors $T_R$ included in the pair of output circuits 112 included in the unit cell 110*b* are turned on and reset output nodes to the driving voltage VDD. The driving voltage VDD is provided to the reset electrodes R' of the unit cells 110*a* and 110*c*, and all reset transistors $T_R$ included in the unit cells 110*a* and 110*c* are turned off. The unit cell 110*c* receives outputs of a logic-high state provided by the unit cell 110*b* after the unit cell 110*b* is reset, and outputs voltages of a logic-low state by inverting the received output. Also, output voltages of the oscillator 100 in a reset state are in phase as shown in FIG. 6 because the pair of output circuits 112 both output voltages of a low state.

According to an exemplary embodiment, the oscillator 100 includes current-adjusting resistances RS connected between the common nodes S of the unit cells. Any one output circuit included in each unit cell provides a mismatched current and noise to the other output circuit through the common node S. The other output circuit amplifies provided mismatched current and noise. However, when the unit cells are connected through the current-adjusting resistances RS, a gain of each output circuit is reduced, influence of an MOS transistor mismatch is reduced, and the gain may be determined to be a ratio between resistances. Therefore, it is possible to remove a bias of the output signal caused by the mismatch, adjust an oscillation period up to phase inversion, and provide a signal having high entropy.

Figure 3:
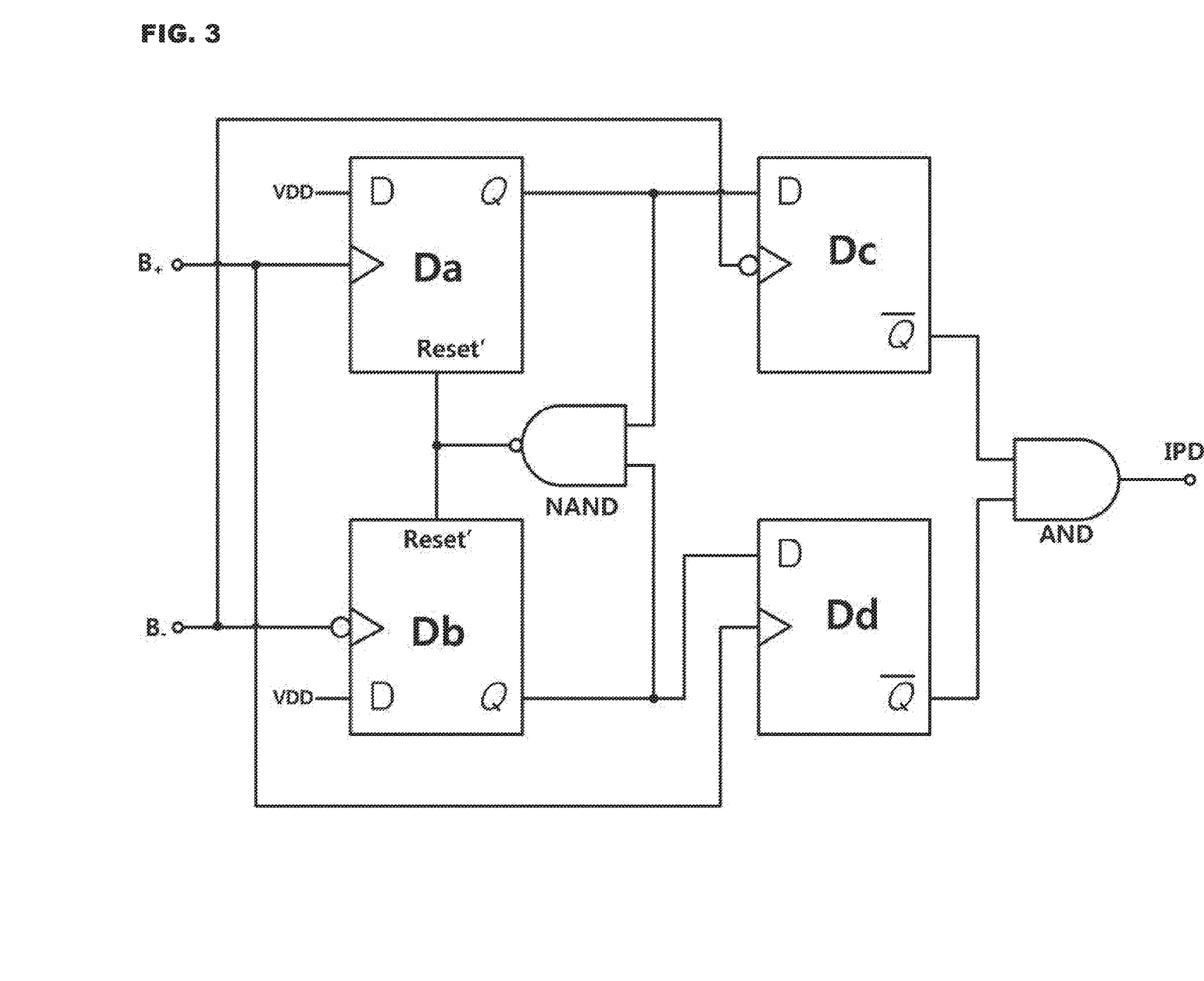
FIG. 3 is a schematic circuit diagram of a phase detector according to an exemplary embodiment.

FIG. 3 is a schematic circuit diagram of the phase detector 200 according to an exemplary embodiment. The phase detector 200 shown in FIG. 3 is just one implementable example, and a phase detector having a different configuration may be used to detect a phase difference between provided signals.

When provided signals $B_+$ and $B_-$ have inverted phases with respect to each other, the phase detector 200 according to the present embodiment outputs the signal IPD indicating the phase-inversion relationship. Referring to FIG. 3, flip-flops Da and Db included in the phase detector 200 receive the output signals $B_+$ and $B_-$ of the oscillator 100. When the output signals $B_+$ and $B_-$ provided by the oscillator 100 have inverted phases with respect to each other, the flip-flops Da and Db provide output signals of a logic-high state in synchronization with the received output signals $B_+$ and $B_-$. A NAND gate NAND1 which receives the output signals $B_+$ and $B_-$ resets the flip-flops Da and Db by providing a reset signal to electrodes R' of the flip-flops Da and Db.

The reset flip-flops Da and Db provide outputs of a logic-low state, and flip-flops Dc and Dd output signals of a logic-high state which are inverted signals with respect to each other. An AND gate receives the signals output by the flip-flops Dc and Dd and outputs the signal IPD indicating that the received signals have the phase-inversion relationship in a logic-high state.

The switch SW receives the output signal IPD of the phase detector 200 through a control electrode and is controlled to be turned on or off. The switch SW is controlled to be turned on or off according to the signal IPD received through the control electrode and provides an output signal of the oscillator 100 received through one electrode to the counter 300 connected to another electrode. According to the exemplary embodiment of the random number generator 10 shown in FIG. 1 and the exemplary embodiment of the phase detector 200 shown in FIG. 3, the switch SW is turned off by receiving the IPD signal of the logic-high state indicating the phase-inversion relationship between the output signals $B_+$ and $B_-$ of the oscillator 100. On the other hand, according to another exemplary embodiment not shown in the drawings, the switch SW is turned on by receiving a signal of a logic-low state.

According to an exemplary embodiment, the switch may be implemented as an N-type metal oxide semiconductor field effect transistor (MOSFET), a p-type MOSFET, an NPN bipolar junction transistor (BJT), a PNP BJT, or another semiconductor switch.

The counter 300 receives the output signal output by the oscillator 100 and counts the number of oscillations. The count result of the counter 300 is provided to the post processing unit 400. According to an exemplary embodiment, the counter 300 is initialized by receiving an initialization signal provided by the pulse generator 500.

Figure 4:
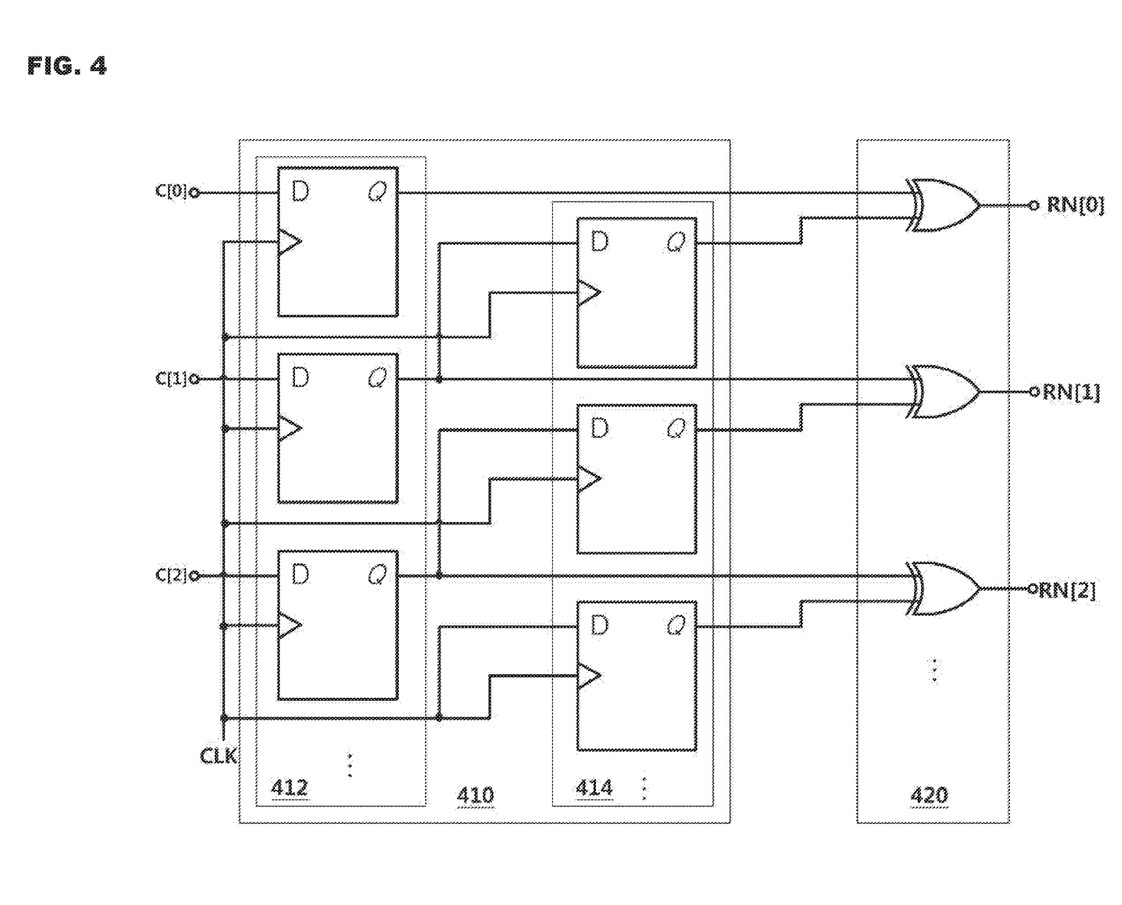
FIG. 4 is a circuit diagram showing a summary of a post processing unit.

FIG. 4 is a circuit diagram showing a summary of the post processing unit 400. Referring to FIG. 4, the count result of the counter 300 is provided to the post processing unit 400. As will be described below, the number of oscillations counted by the counter 300 is used by the post processing unit 400 as a seed for generating a random number.

The post processing unit 400 includes a register 410 which stores the count result of the counter 300 and a calculator 420 which performs a logical operation on the count result. The count result, which is binary data stored in the counter 300, is stored in the register 410 in synchronization with a clock.

The binary data, which is information on the number of oscillations output by the counter 300, is stored in a first register group 412 in synchronization with the clock. At a subsequent clock, the binary data stored in the first register group 412 is provided to a second register group 414 and stored. According to another exemplary embodiment of the register 410 not shown in the drawings, the register 410 may include three or more register groups.

The calculator 420 generates any one bit of a random number RN by performing a logical operation on an output of the first register group 412 and an output of the second register group 414, and outputs the generated bit. In the exemplary embodiment shown in the drawing, a logical operation is performed on a current bit and a bit of one previous clock, but in another exemplary embodiment not shown in the drawing, a logical operation is performed on the current bit and bits of two previous clocks to generate any one bit of the random number RN.

Also, in the exemplary embodiment shown in the drawing, the calculator performs an exclusive disjunction operation (exclusive OR), but in another exemplary embodiment not shown in the drawings, the calculator 420 generates any one bit of the random number by performing a logical operation, such as exclusive conjunction (exclusive AND), disjunction (OR), conjunction (AND), negation of conjunction (NAND), negation of disjunction (NOR), and the like.

According to the calculator 420 of the present embodiment, it is possible to obtain a random number having higher entropy. For example, when an average between 0 and 1 of one signal is 0.3 or 0.7 and an average of another signal generated from another signal source is 0.4 or 0.6, an average of a signal newly generated through a logical operation approximates 0.5, which is an ideal average between 0 and 1, and the newly generated signal is not biased, that is, it is possible to acquire a signal having high entropy.

However, in the above example, the two signals are required to be provided by different independent signal sources. However, according to the present embodiment, a value generated at a previous clock is stored in a register, and then a logical operation is performed on the stored signal and a signal generated at a subsequent clock, so that a signal having high entropy may be generated without using a plurality of independent signal sources. The oscillator 100 according to the present embodiment changes in the number of oscillations due to thermal noise. This is because thermal noises over time are un-correlated with each other and it is possible to consider the signals generated at the previous clock and the subsequent clock to be independent from each other.

Figure 5:
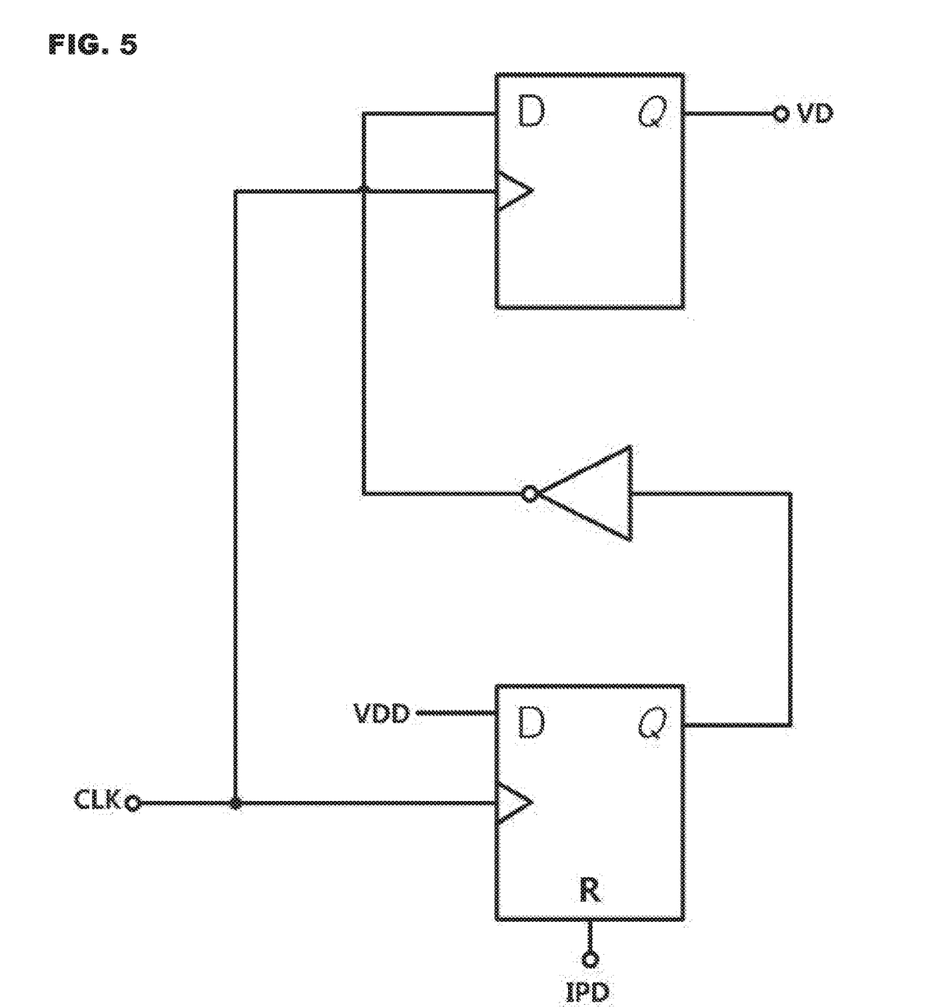
FIG. 5 is a diagram showing a summary of a detection unit.

FIG. 5 is a diagram showing a summary of the detection unit 600. Referring to FIG. 5, the detection unit 600 detects whether a valid random number has been generated. When the true random number generator 10 does not operate normally due to an external condition or attack, the detection unit 600 outputs a detection signal of a logic-low state to a node VD of FIG. 5. For example, when the random number generator 10 is attacked from the outside, the oscillator 100 may not operate normally. In this case, a register synchronized with a clock outputs a specific pattern. When the oscillator 100 operates normally in spite of the external attack and two output signals have inverted phases with respect to each other, the signal IPD is put in a logic-high state. Therefore, the detection unit 600 outputs an output signal VD of a logic-high state using the signal IPD. On the other hand, when the signal IPD is not generated, the output signal VD of the detection unit 600 is placed in a logic-low state, and it is possible to recognize that a generated random number is invalid.

Figure 7:
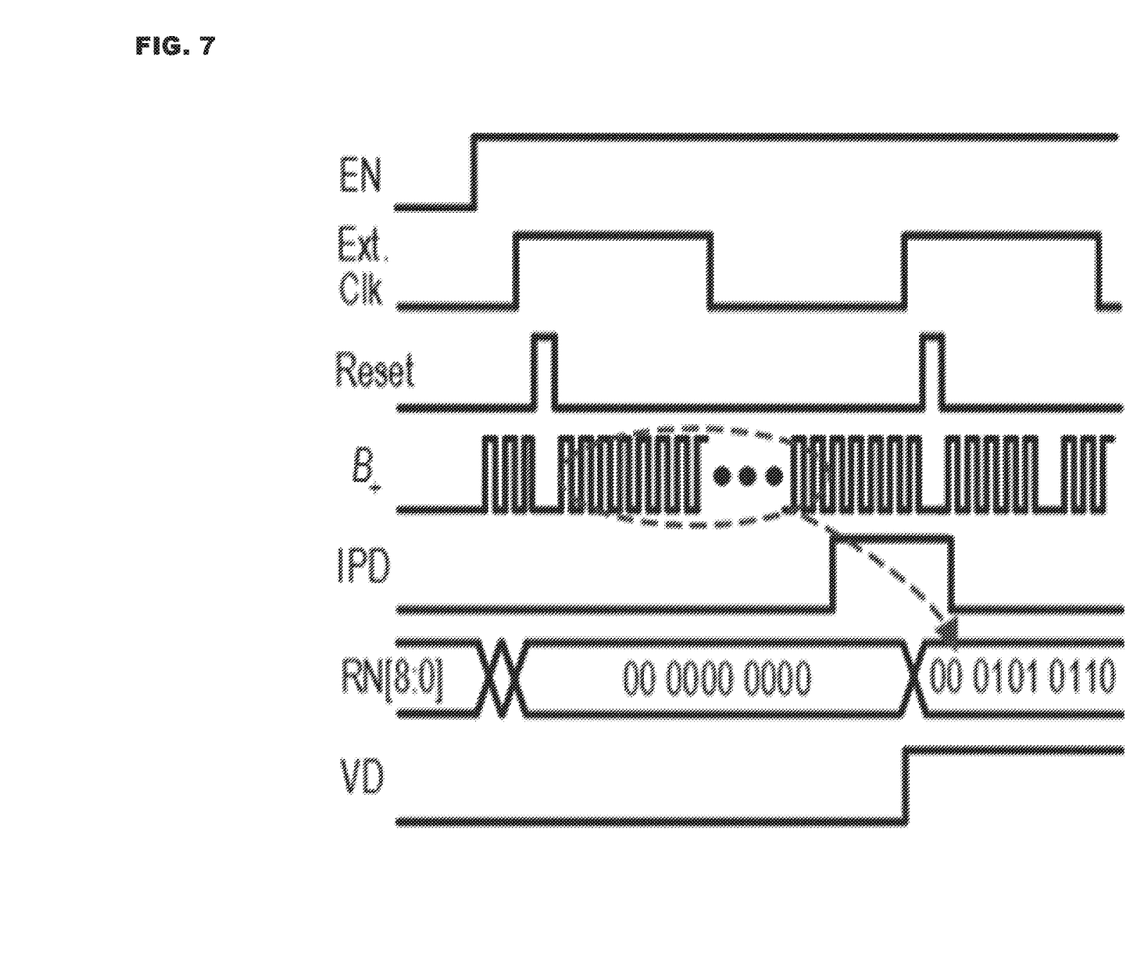
FIG. 7 is a timing diagram of signals in a true random number generator according to an exemplary embodiment.

Operation of the true random number generator 10 according to the present embodiment will be described below with reference to FIGS. 6 and 7. FIG. 6 is a diagram schematically showing an output signal of the oscillator 100. FIG. 7 is a timing diagram of signals in the true random number generator 10 according to the present embodiment.

When the driving signal EN is provided for operation of the true random number generator 10 and the clock signal CLK and the driving voltage VDD provided by the multiplexer are provided to the AND gate, the AND gate outputs a signal of a logic-high state. The pulse generator 500 receives the signal from the AND gate and provides a reset signal Reset. The reset signal Reset output by the pulse generator 500 may have a pulse width of, for example, 2 to 3 ns. Also, a random number generation period may have a frequency of about several to tens of MHz. According to an exemplary embodiment, the reset signal Reset shown in FIG. 7 has a short pulse width and is provided in a logic-high state to make a reset. However, when a reset switch included in the oscillator 100 is a PMOS, a reset may be made by providing a signal of a logic-low state obtained by inverting the reset signal Reset.

The oscillator 100 receives the reset signal Reset and provides output signals which have inverted phases with respect to each other, and the counter 300 receives the reset signal Reset and is initialized.

The pair of output circuits 112 included in each of the unit cells 110a, 110b, and 110c receive input signals, amplify the input signals, and output the amplified input signals. However, unlike an amplifier which reduces influence of noise, amplifies an input signal with high gain, and outputs the amplified input signal, output signals of amplifiers included in the pair of output circuits 112 are more influenced by noise including thermal noise and the like than the input signals due to the signal degrading resistances RD.

Also, there is a slight current mismatch between the amplifiers constituting the pair of output circuits 112. A process in which a current provided by any one amplifier is provided to the other amplifier through the common node S and then amplified is repeated, and influence of the current mismatch is amplified and affects output signals output by the corresponding unit cell. Further, noise in the pair of output circuits 112 is also amplified by the amplifiers, and influence thereof on the output signals increases.

Signals output by the oscillator 100 which are initially in phase oscillate to have a phase difference due to the aforementioned influences. With the progress of oscillation, the aforementioned influence of noise and the aforementioned influence of a current mismatch are accumulated, and then the signals output by the oscillator 100 obtain the phase-inversion relationship. The phase detector 200 detects phase-inversion of the output signals and turns off the switch SW by outputting the signal IPD indicating the phase inversion.

The counter 300 counts the number of oscillations of an output signal of the oscillator 100 until the switch SW is turned off, and provides the counted number of oscillations to the post processing unit 400. The first register 412 included in the post processing unit 400 receives, stores, and outputs the number of oscillations provided by the counter 300.

The second register 414 stores information on the number of oscillations counted at a previous clock CLK. The calculator 420 performs a logical operation on bits provided by the first register 412 and the second register 414 and provides a random number RN.

Since a random number generator according to an exemplary embodiment of the present invention uses a differential structure oscillator which has a random number of oscillations due to noise, it is possible to generate a random number having higher entropy.

Although exemplary embodiments of the present invention have been described in detail above with reference to the accompanying drawings, the present invention is not limited to these embodiments and may be practiced in a variety of modified ways without departing from the technical spirit of the present invention. Therefore, the embodiments disclosed in the present invention are intended not to limit but to describe the technical scope of the present invention, and the scope of the technical spirit of the present invention is not limited by the embodiments. The embodiments set forth herein should be construed as exemplary and not limiting. The scope of the present invention is disclosed in the following claims, and all technical spirits within the range of their equivalents shall be construed as being included in the scope of the present invention.

What is claimed is:

1. A random number generator comprising:
    an oscillator configured to output signals which oscillate a random number of times due to noise after initialization;
    a phase detector configured to receive the output signals and determine whether phases of the output signals have been inverted with respect to each other; and
    a counter configured to count the number of oscillations of the output signals until the phases of the output signals are inverted with respect to each other,
    wherein the counted number of oscillations is used as a seed for generating a random number.

2. The random number generator of claim 1, wherein when the phases of the output signals are inverted with respect to each other, a phase difference between the output signals is 180 degrees.

3. The random number generator of claim 2, further comprising:
    a switch configured to provide the output signals of the oscillator to the counter or block the output signals, wherein the switch is controlled to be turned on or off by an output of the phase detector.

4. The random number generator of claim 1, wherein the output signals are in phase at the initialization.

5. The random number generator of claim 1, further comprising:
    a post processing unit including a register configured to store the number of oscillations counted by the counter, and a calculator configured to perform a logical operation on the number of oscillations.

6. The random number generator of claim 5, wherein the register stores the number of oscillations as binary information, and
    the calculator performs an exclusive disjunction operation (exclusive OR) on bits to generate a random number.

7. The random number generator of claim 1, further comprising:
    a pulse generator configured to initialize the oscillator by providing an initialization signal.

8. The random number generator of claim 7, wherein the initialization signal is provided to the counter to initialize the counter.

9. An oscillator for generating a random number, wherein unit cells are cascaded to oscillate and individually include a pair of output circuits, and each of the pair of output circuits includes:
    a P-type metal oxide semiconductor (PMOS) transistor and an N-type metal oxide semiconductor (NMOS) transistor connected between a driving voltage and a common node and having gate electrodes connected to each other to receive an input signal, wherein the common nodes of the pair of output circuits are connected to form a single node; and
    input signal degrading resistances connected between a drain electrode of the PMOS transistor and a drain electrode of the NMOS transistor and configured to reduce influence of the input signal on an output signal and increase influence of noise.

10. The oscillator of claim 9, wherein the input signal degrading resistances connected between the drain electrode of the PMOS transistor and the drain electrode of the NMOS transistor include:
    a first input signal degrading resistance connected between the drain electrode of the PMOS transistor and an output node; and
    a second input signal degrading resistance connected between the drain electrode of the NMOS transistor and the output node.

11. The oscillator of claim 9, wherein each of the pair of output circuits further includes:
    a feedback resistance connected between an input node to which the input signal is provided and an output node from which the output signal is provided.

12. The oscillator of claim 9, wherein each of the unit cells further includes:
    reset transistors configured to reset the pair of output circuits.

13. The oscillator of claim 9, wherein each of the unit cells further includes:
    an activation transistor connected to the common node and configured to activate the unit cell.

* * * * *